United States Patent
Natori

(10) Patent No.: US 8,792,107 B2
(45) Date of Patent: Jul. 29, 2014

(54) INFORMATION PROCESSING APPARATUS, METHOD FOR UNINSTALLING PRINTER DRIVER, AND RECORDING MEDIUM

(75) Inventor: Takuya Natori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/044,936

(22) Filed: Mar. 10, 2011

(65) Prior Publication Data

US 2011/0222096 A1 Sep. 15, 2011

(30) Foreign Application Priority Data

Mar. 11, 2010 (JP) .................................. 2010-054454

(51) Int. Cl.
*G06F 3/12* (2006.01)

(52) U.S. Cl.
USPC .......................................... 358/1.13; 358/1.15

(58) Field of Classification Search
None
See application file for complete search history.

(56) References Cited

U.S. PATENT DOCUMENTS

| 2007/0101345 A1* | 5/2007 | Takagi | 719/321 |
| 2008/0098303 A1* | 4/2008 | Murayama | 715/274 |
| 2008/0285082 A1* | 11/2008 | Morooka | 358/1.18 |
| 2010/0225946 A1* | 9/2010 | Fukasawa | 358/1.13 |

FOREIGN PATENT DOCUMENTS

| JP | 2001-092642 A | 4/2001 |
| JP | 2004-287764 A | 10/2004 |

* cited by examiner

*Primary Examiner* — Marivelisse Santiago Cordero
*Assistant Examiner* — Moustapha Diaby
(74) *Attorney, Agent, or Firm* — Canon USA Inc. IP Division

(57) ABSTRACT

An uninstaller extracts a print setting included in only a printer driver to be uninstalled, deletes information relating to the extracted print setting from all presets (a preset description file) to be registered in an OS, extracts a default value of print setting items for all print queues other than a print queue corresponding to the printer driver to be uninstalled, deletes information relating to the preset which does not differ in the print setting from the extracted default value from the preset description file, and uninstalls the printer driver.

7 Claims, 19 Drawing Sheets

FIG.7

○—707  PRINTER ADDITION

ADDRESS: | 192.168.1.10 |—702

NAME: | PrinterC |—703

LOCATION: | 2F |—704

DRIVER: | ABC PDL1 ▼|—705

( ADD )—706

901: <Printer PrinterC_192.168.1.10_>

902:   Info PrinterC

903:   Location 2F

904:   DeviceURI lpd://192.168.1.10

905:   DriverName ABC PDL1

906: </Printer>

FIG.10

1001: *%Printer Description for PrinterC
1002: *Manufacturer: "ABC"
1003: *Product: "PrinterC"
1004: *PrinterLanguage: ABC PDL1
1005: *DriverVersion: "PDL1 1.00"

1006: *OpenUI *PageSize: PickOne
1007: *DefaultPageSize: A4
1008: *PageSize A3
1009: *PageSize A4
. . . . . . . .
1010: *CloseUI *PageSize 1011: *OpenUI *Duplex: PickOne
1012: *DefaultDuplex: None
1013: *Duplex None
1014: *Duplex Simplex
1015: *Duplex Duplex
1016: *CloseUI *Duplex

FIG.11

/etc/cups/ppd/ ── PrinterA_192.168.1.3_.ppd ∼1102
   }            ├─ PrinterB_192.168.1.4_.ppd ∼1103
  1101          └─ PrinterC_192.168.1.10_.ppd ∼1104

FIG.12

PRINT SETTING

PRINTER: PrinterA ▼ —1202
PRESET: Standard ▼ —1203
NUMBER OF COPIES: 1 —1204
PAPER SIZE: A4 ▼ —1205

FINISHING ▼
—1206

PRINTING METHOD: ONE-SIDED ▼ —1207

SHEET DISCHARGING METHOD:
☐ STAPLE  UPPER LEFT (ONE LOCATION) ▼ —1208
☐ BOOKBINDING PRINTING  OPEN TO RIGHT ▼ —1209

(CANCEL)  (PRINT)

1301: <CustomPresetsList>

1302:   <PresetSettings name="Standard">

1303:   </PresetSettings>

1304:   <PresetSettings name="Preset1">

1305:     ABC.ColorMode  Color

1306:     ABC.Duplex   Simplex

1307:     ABC.Resolution  600

1308:     ABC.LastQueue  NULL

1309:   </PresetSettings>

1310: </CustomPresetsList>

FIG.15A

|  | Driver A | Driver B | Driver C | Driver D |
|---|---|---|---|---|
| ColorMode | ○ | ○ | ○ |  |
| Duplex |  | ○ |  |  |
| Staple |  |  | ○ |  |
| Punch |  |  |  | ○ |
| Copies | ○ | ○ | ○ | ○ |

FIG.15B

|  | Preset P | Preset Q | Preset R | Preset S |
|---|---|---|---|---|
| ColorMode |  | ○ | ○ | ○ |
| Duplex |  | ○ |  | ○ |
| Staple |  |  |  |  |
| Punch | ○ |  | ○ | ○ |
| Copies | ○ | ○ | ○ | ○ |

FIG.15C

|  | Preset Q | Preset S |
|---|---|---|
| ColorMode | ○ | ○ |
| Duplex | ○ | ○ |
| Staple |  |  |
| Copies | ○ | ○ |

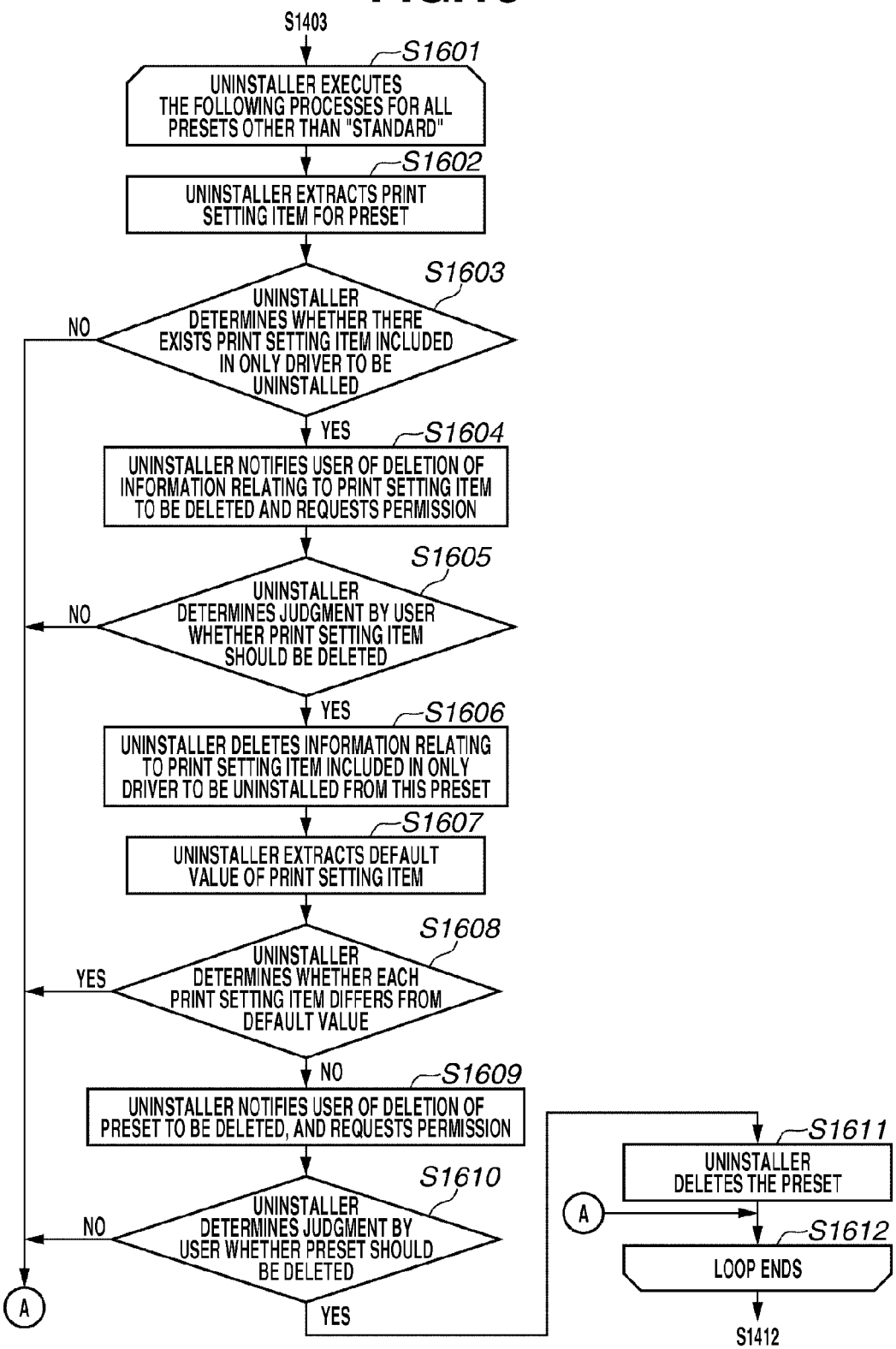

INFORMATION PROCESSING APPARATUS, METHOD FOR UNINSTALLING PRINTER DRIVER, AND RECORDING MEDIUM

BACKGROUND OF THE INVENTION

1. Field of the Invention

The present invention generally relates to control performed when a printer driver is uninstalled and, more particularly, to an information processing apparatus, method for uninstalling a printer driver, and a recording medium.

2. Description of the Related Art

Conventionally, in an environment in which a plurality of printer drivers is installed in a client computer, several methods or inventions have been proposed with respect to various types of settings performed when the printer drivers are uninstalled.

Japanese Patent Application laid-Open No. 2001-92642 proposes means for notifying a user of a procedure for an operation for changing various types of setting contents relating to software if it is determined that an operational failure may occur in an operating system (OS) at the time of uninstallation, and for changing the setting contents.

On the other hand, a proposal considering not only an operational failure but also convenience to a user after uninstallation has been made. Japanese Patent Application Laid-Open No. 2004-287764 proposes control to urge a user to set, when a printer driver to be uninstalled is set as a usually used printer driver, a printer driver different from the printer driver to be uninstalled as a usually used printer driver.

An issue to be solved by the present invention relates to a system environment in which an OS holds a cross-sectional print setting for printer drivers, for example, a system environment that operates on various types of OSs on a UNIX (registered trademark) basis such as Linux (registered trademark) subsequent to Mac OS X. In this system environment, the OS also holds information relating to a preset of a printer driver in a cross-sectional manner for printer drivers. Therefore, a conventional uninstaller for uninstalling a printer driver deletes a group of modules for controlling an installed printer driver and a setting file describing information relating to a printer.

However, such an uninstaller does not perform special processing for a preset. Therefore, a preset storing a setting relating to the uninstalled printer driver may remain as a preset, which makes no practical sense for a user, in a system even after the uninstallation. Although such a phenomenon in which a preset remains in a system is not an operational failure, it is undesirable in consideration of convenience to the user.

SUMMARY OF THE INVENTION

The present invention is directed to a method for uninstalling, from an information processing apparatus which registers a print setting in a print queue registered by a printer driver as a preset in an operating system in a cross-sectional manner for printer drivers, the printer driver, and then preventing the preset storing a setting relating to the uninstalled printer driver from remaining as a preset, which makes no practical sense for a user, in the information processing apparatus.

According to an aspect of the present invention, an information processing apparatus capable of performing printing by registering a print setting in a print queue registered by a printer driver as a preset in an operating system in a cross-sectional manner for a plurality of printer drivers and calling the registered preset as a print setting in a print queue registered by one of the printer drivers includes an extraction unit configured to extract, out of the print setting, a print setting included in only a printer driver to be uninstalled, an acquisition unit configured to acquire the print setting as the preset registered in the operating system, a first determination unit configured to determine whether the print setting as the preset includes the print setting included in only the printer driver to be uninstalled, a first deletion unit configured to delete, when the first determination unit determines that the print setting as the preset includes the print setting included in only the printer driver to be uninstalled, information relating to the print setting included in only the printer driver to be uninstalled from the preset, a comparison unit configured to compare the print setting as the preset with a default value of the print setting in the print queue, a second deletion unit configured to delete, when it is determined by the comparison unit that there is no difference between the print setting as the preset and the default value for the print setting in the print queue, the preset, and an uninstallation unit configured to uninstall the printer driver to be uninstalled.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a print queue addition dialog.

FIG. 9 illustrates a file describing information relating to a print queue to be registered.

FIG. 10 illustrates an example of a printer specification description file.

FIG. 11 illustrates a storage location of a printer specification description file and its file name.

FIG. 12 illustrates a user interface (I/F) (a print dialog) obtained when a print setting dialog in a registered print queue is opened.

FIG. 13 illustrates an example of a preset description file storing a setting content of a preset.

FIGS. 15A to 15C illustrate an example of updating of a preset setting at the time of uninstallation.

FIG. 16 is a flowchart illustrating a part of a procedure for uninstallation in a second exemplary embodiment of the present invention.

DESCRIPTION OF THE EMBODIMENTS

Various exemplary embodiments, features, and aspects of the invention will be described in detail below with reference to the drawings.

Figure 1:
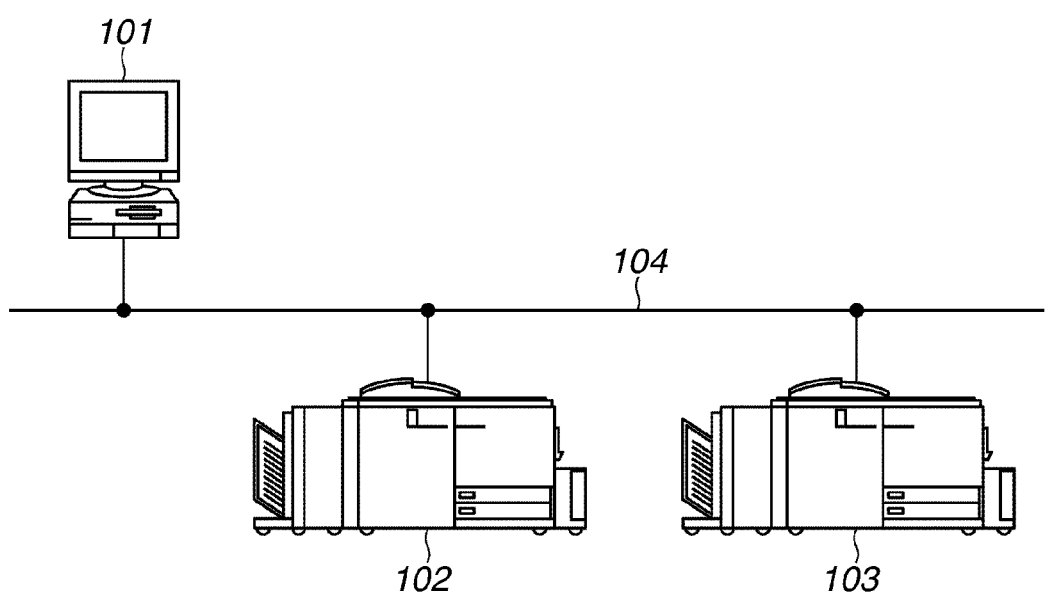
FIG. 1 illustrates an example of a system to which the present invention is applied.

FIG. 1 illustrates an example of a system to which the present invention is applied. In FIG. 1, a client computer 101 (hereinafter referred to as a computer 101) serving as an information processing apparatus and network printers (hereinafter referred to as printers) 102 and 103 are connected to a computer network 104. An operating system (OS) (including a printing system), an application, a printer driver, and so on are installed into the computer 101. The system can send user data from the computer 101 to the printer 102 or 103, and print the user data.

The computer 101 operates on an OS for holding a cross-sectional print setting for printer drivers. Examples include computers that operate on OSs subsequent to Mac OS X. OSs subsequent to Mac OS X typically use Common UNIX™ Printing System (CUPS) as a standard printing system. However, the present invention is not limited to the computers that operate on the OSs subsequent to Mac OS X. The present invention is also applicable to any computer capable of performing printing by registering a print setting in a print queue registered by the printer driver as a preset in an OS in a cross-sectional manner for a plurality of printer drivers and calling the registered preset as a print setting in a print queue registered by any one of the printer drivers. The printing system is not limited to the CUPS. The CUPS is used as a standard printing system in OSs subsequent to Mac OS X, and operates on OSs subsequent to Mac OS X (usually operates as a demon). In the present exemplary embodiment, the CUPS is included in an OS package. Accordingly, even an operation described as performed by the OS may include an operation performed by the CUPS. The CUPS may be installed separately from the OS. The CUPS uses Internet Printing Protocol (IPP) to manage a print job and a print queue. Further, the CUPS uses PostScript Printer Description (PPD) to describe a function usable by a printer.

Figure 2:
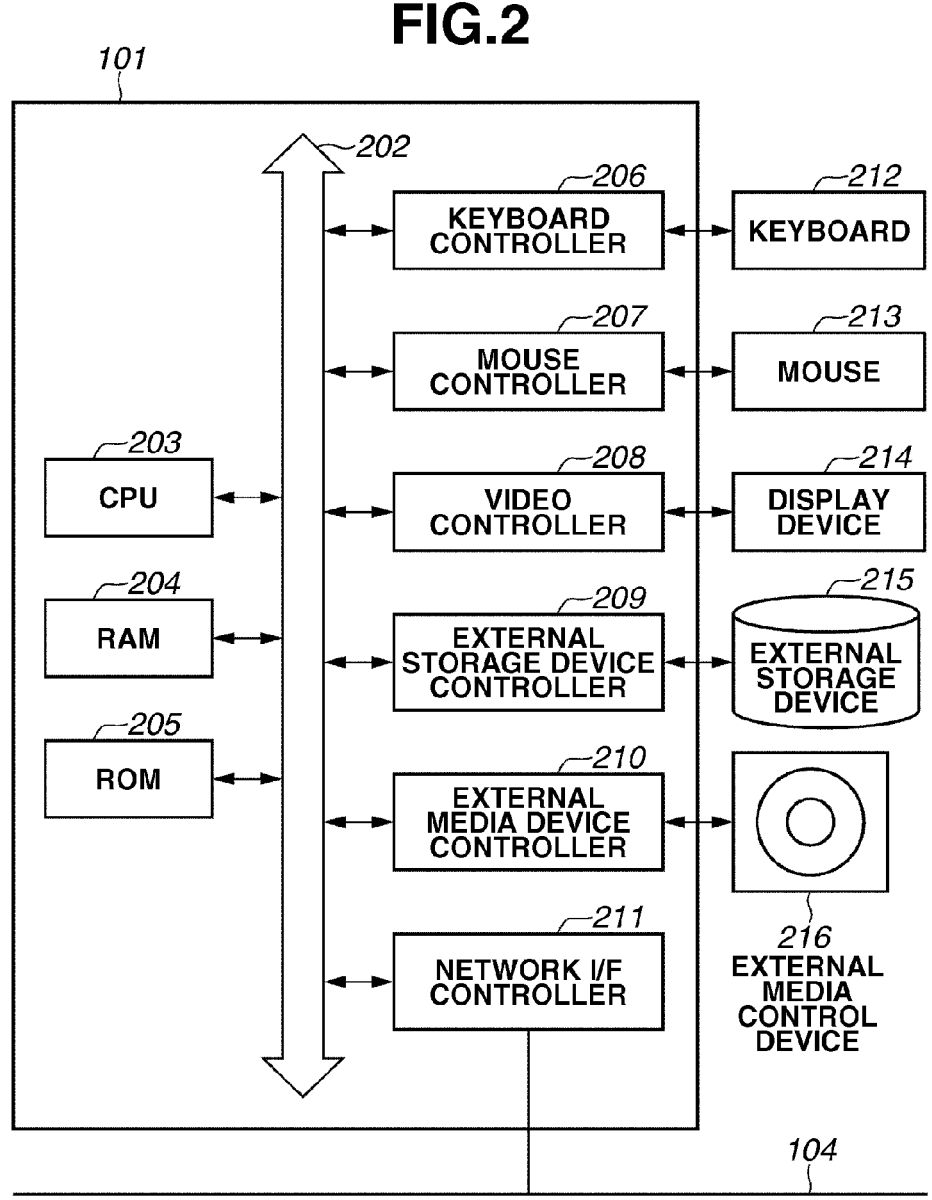
FIG. 2 is a block diagram illustrating a hardware configuration of a computer.

FIG. 2 is a block diagram illustrating a hardware configuration of the computer 101. In FIG. 2, the computer 101 includes a processer 203 serving as a central processing unit (CPU), a random access memory (RAM) 204 serving as a volatile memory, a read-only memory (ROM) 205 serving as a nonvolatile memory, a keyboard controller 206, and a mouse controller 207. A keyboard 212 for operating the computer 101 is connected to the keyboard controller 206. The keyboard controller 206 controls input from the keyboard 212. A pointing device such as a mouse (hereinafter described as a mouse) 213 is connected to the mouse controller 207 for a user to operate the computer 101. The mouse controller 207 controls input from the mouse 213.

The computer 101 further includes a video controller 208, and an external storage device controller 209. A display device 214 is connected to the video controller 208. The video controller 208 controls output to the display device 214. A nonvolatile external storage device 215 (e.g., a hard disk) for storing an application program or large-capacity data is connected to the external storage device controller 209. The external storage device controller 209 controls reading and writing of data from and to the external storage device 215.

The computer 101 further includes an external media device controller 210. An external media control device 216 is connected to the external media device controller 210. The external media device controller 210 controls reading and writing of external media (a computer-readable recording medium having a program or data recorded thereon, for example, a compact disk (CD)-ROM or a digital versatile disk (DVD)-ROM) set in the external media control device 216. When an application or driver software is provided by the external media, for example, a user can set the media such as the CD-ROM in the external media control device 216, and read the program into the computer 101.

The computer 101 further includes a network I/F controller 211. The network I/F controller 211 controls connection to the network 104. The computer 101 can communicate with the other devices (102, 103) connected to the computer network 104 using the network I/F controller 211.

Generally, an initial program for starting the computer 101 and a basic program for controlling each module in the computer 101 are stored in the ROM 205. An OS (including a printing system), an application, and a printer driver are stored in the external storage device 215. When power to the computer 101 is turned on, the CPU 203 first executes a program stored in the ROM 205 for starting the computer 101. The CPU 203 loads the OS stored in the external storage device 215 into the RAM 204 by executing the program, and then transfers a control authority to the OS. An operation performed by the CPU 203 executing the OS will be described as performed by the OS.

The OS reads a necessary module or printer driver into the RAM 204 from the external storage device 215. Further, the OS reads a necessary application into the RAM 204 from the external storage device 215, and executes the application by an instruction from a user. The external media such as the CD-ROM supply a printer driver, an installer of the printer driver, and an uninstaller of the printer driver, which will be described in the present exemplary embodiment. The user sets the external media in the external media control device 216. The CPU 203 reads the printer driver, the installer, and the uninstaller into the RAM 204 from the external media, as needed, and stores the printer driver, the installer, and the uninstaller in the external storage device 215.

Figure 3:
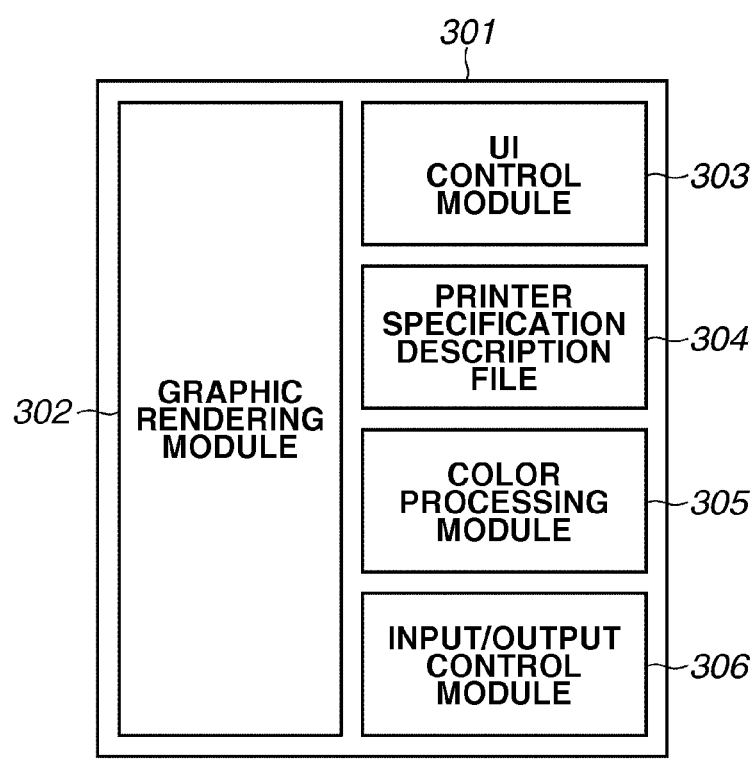
FIG. 3 is a block diagram illustrating a configuration of a printer driver.

A printer driver will be described below. FIG. 3 is a block diagram illustrating a configuration of the printer driver. As illustrated in FIG. 3, a printer driver 301 includes a group of modules such as a graphic rendering module 302, a user interface (UI) control module 303, a printer specification description file 304, a color processing module 305, and an input/output control module 306. The printer driver 301 may include another module depending on its function.

The graphic rendering module 302 renders print data received from the printing system in the OS into print data (a page description language (PDL)) that can be understood by a printer. The UI control module 303 is based on the printer specification description file 304 describing a function usable in the printer (printer specification information) to display the function usable in the printer and accept a setting from a user. The color processing module 305 performs color processing based on an integrated communication controller (ICC) profile. The input/output control module 306 sends the print data to the printer.

Figure 4:
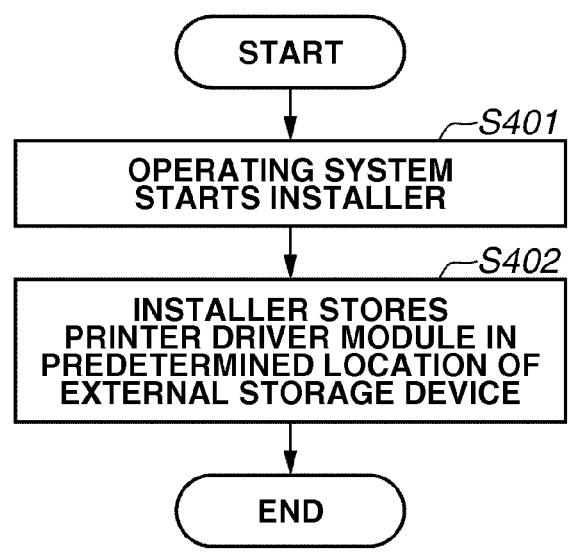
FIG. 4 is a flowchart illustrating a procedure for installing a printer driver.

A procedure for installing the printer driver thus configured into the computer 101 will be described below. FIG. 4 is a flowchart illustrating a procedure for installation into the printer driver. The CPU 203 executes a printer driver installer (hereinafter referred to as an installer) on the OS, to implement processes in the flowchart. The user prepares a CD-ROM storing the printer driver, or acquires the installer via the network 104.

In step S401, when the user first performs an operation for starting the installer, the OS detects this operation to start the installer. An operation performed by the CPU 203 executing the OS will be described as performed by the OS with the OS as a subject. An operation performed by the CPU 203 executing the installer on the OS will be described as performed by the installer with the installer as a subject.

In step S402, the started installer reads out a printer driver module from the CD-ROM or the like, to store the printer driver module in a predetermined location of the external storage device 215. A storage location of the printer driver module differs depending on a printing system. As an example, in the CUPS, a printer driver module is stored for each vendor below a directory "/Library/Printers/". The printer driver module can also be stored for each type of printer driver below the directory for each vendor. When there are different printer drivers "PDL1" and "PDL2" for a vendor "ABC", for example, a directory "/Library/Printers/ABC/PDL1" and a directory "/Library/Printers/ABC/PDL2/" are first generated respectively for the printer drivers "PDL1" and "PDL2", and the printer drivers "PDL1" and "PDL2" are respectively stored below the corresponding directories.

While the installation of the printer driver is thus completed, the user is required to register the printer in the printing system using the printer driver to actually enable output to the printer. The printer to be registered in the printing system will be hereinafter referred to as a print queue or simply referred to as a queue.

Figure 5:
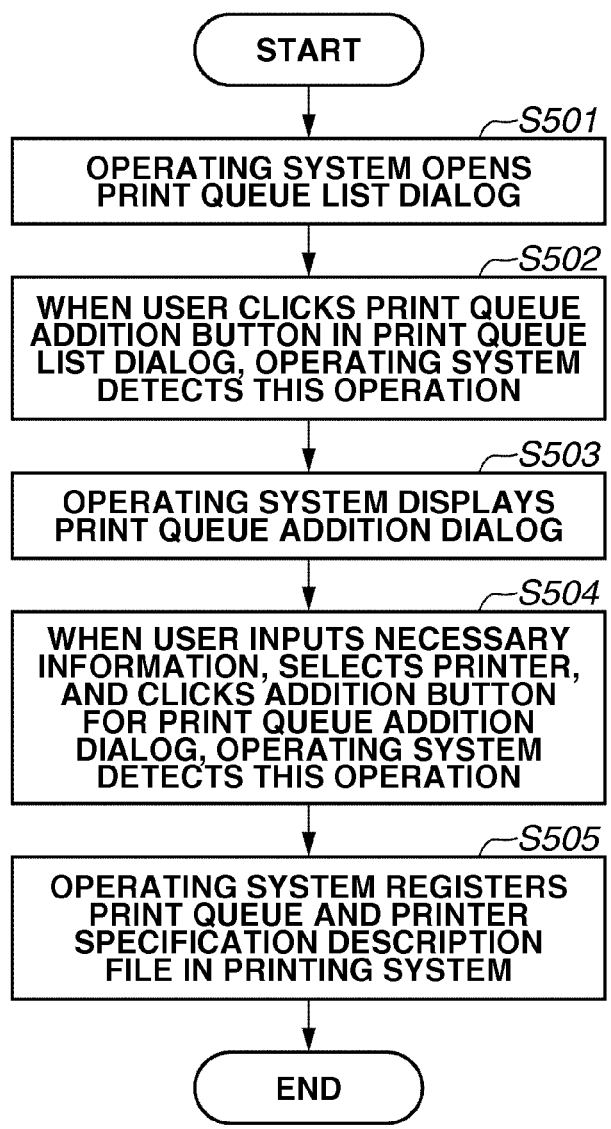
FIG. 5 is a flowchart illustrating a procedure for registering a print queue.

FIG. 5 is a flowchart illustrating a procedure for registering a print queue. The flow will be described with reference to necessary figures along the procedure. The CPU 203 executes the OS to implement processes in the flowchart. An operation performed by the CPU 203 executing the OS will be described as performed by the OS with the OS as a subject.

In step S501, when a user performs an operation for opening a printer registration list dialog (hereinafter referred to as a print queue list dialog) 601 (FIG. 6), the OS detects this operation to open the print queue list dialog 601. In this step, the OS reads out a program code for registering a print queue to the RAM 204 from the external storage device 215, and executes the program code.

Figure 6:
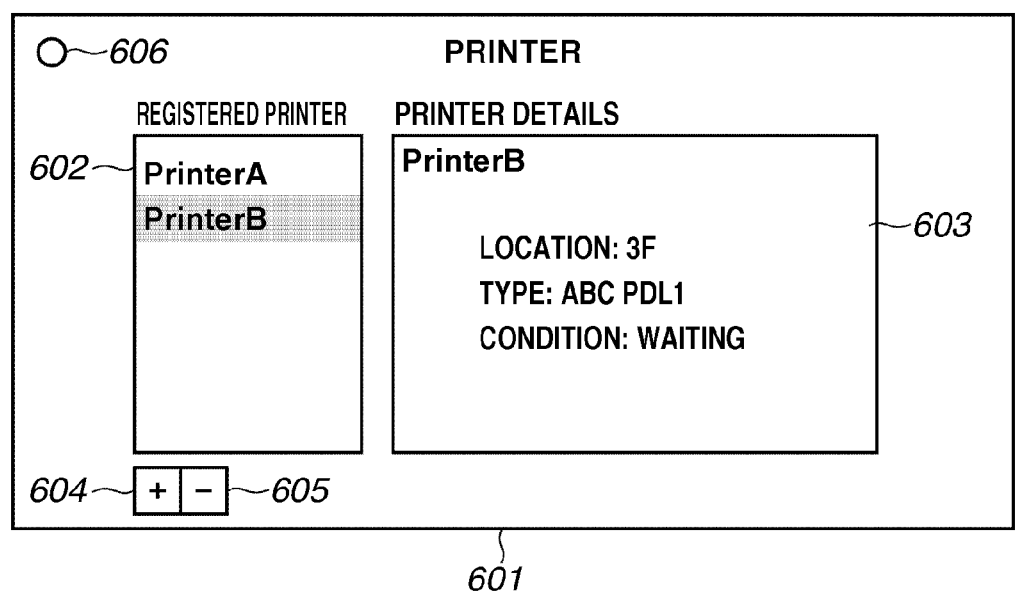
FIG. 6 illustrates a print queue list dialog.

FIG. 6 illustrates the print queue list dialog 601 displayed by the OS. The print queue list dialog 601 includes a registered print queue list 602 in which currently registered print queues are displayed, and a print queue detail display area 603 in which information relating to details of the print queue selected in the registered print queue list 602 is displayed. A button 604 is used to newly add a print queue. A button 605 is used to delete the print queue selected in the registered print queue list 602. A button 606 is used to close the print queue list dialog 601.

The flowchart illustrated in FIG. 5 will be described again. In step S502, when the user clicks the print queue addition button 604 in the print queue list dialog 601, the OS detects this operation. In step S503, the OS displays a print queue addition dialog 701 (FIG. 7). When the user performs an operation for inputting necessary information, described below, selecting a printer, and adding a printer in the displayed print queue addition dialog 701 (FIG. 7), the OS detects this operation, and then the processing proceeds to step S505.

FIG. 7 illustrates the print queue addition dialog 701. In the print queue addition dialog 701, a control 702 designates a network address (an internet protocol (IP) address in this example), a control 703 inputs a name of a printer for identifying a print queue, and a control 704 inputs a location where the printer is installed. Character strings respectively input to the printer name input control 703 and the printer location input control 704 are used for the display in the registered print queue list 602 and the print queue detail display area 603, illustrated in FIG. 6.

A control 705 designates a printer driver used when the print queue is registered. The OS lists printer drivers listed in the control 705 and stored below the printer driver storage directory ("Library/Printers") of the OS, described above.

In the example illustrated in FIG. 7, "192.168.1.10", "PrinterC", "2F", and "ABC PDL1" are respectively selected as the address, the name, the location, and the printer driver. In step S504 illustrated in FIG. 5, when the user clicks an addition button 706 in this state, the OS detects this operation. In step S505 illustrated in FIG. 5, the OS adds a print queue. When the OS closes the print queue addition dialog 701 without adding a print queue, the user clicks a dialog close button 707.

The flowchart illustrated in FIG. 5 will be described again. In step S505, the OS registers the print queue designated in the print queue addition dialog 701 by the user and a printer specification description file included therein in the printing system, and then the processing ends. Step S505, described above, will be described in detail with reference to FIGS. 8 to 11.

Figure 8:
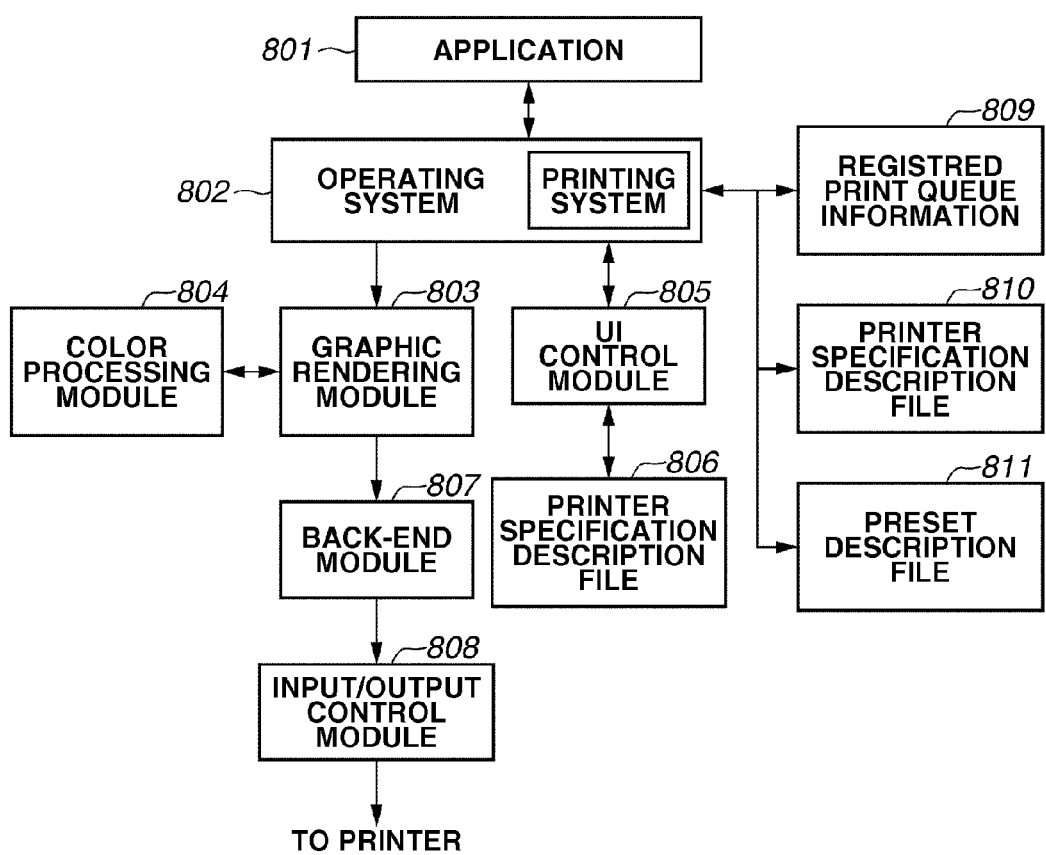
FIG. 8 is a system block diagram illustrating a state where a print queue has already been registered in a computer.

FIG. 8 is a system block diagram illustrating a state where a print queue has already been registered in the computer 101. A graphic rendering module 803 illustrated in FIG. 8 corresponds to the graphic rendering module 302 in the printer driver 301 stored below the predetermined directory ("/Library/Printers/") of an OS 802 according to the above-mentioned procedure. Similarly, a UI control module 805 corresponds to the UI control module 303 in the installed printer driver. A color processing module 804 corresponds to the color processing module 305 in the installed printer driver. An input/output control module 808 corresponds to the input/output control module 306 in the installed printer driver. A printer specification description file 806 corresponds to the printer specification description file 304 in the installed printer driver.

A back-end module 807 is provided by the OS 802, and is used to transfer print data generated by the graphic rendering module 803 to the input/output control module 808. The input/output control module 808 that has received the print data from the back-end module 807 sends the print data to the printer. The OS 802 generates registered print queue information 809 and a printer specification description file 810 in the processes for print queue registration illustrated in FIG. 5. Details thereof will be described below.

In step S505 illustrated in FIG. 5, the OS 802 collects information relating to the print queue addition dialog 701 to perform a work for registering the print queue in the printing system. The registration work is performed as follows.

FIG. 9 illustrates a file describing information relating to a print queue to be registered. The file is described in a markup language. In FIG. 9, a line 901 indicates an identifier 901 for identifying a print queue, and describes a name of a printer, followed by an underscore, further followed by an address of the printer. A line 902 describes the name of the printer. A line 903 describes an installation location of the printer. A line 904 describes an actual print queue. In this example, the print queue is sent to an address "192.168.1.10" using a lpd protocol. A line 905 describes a name of a printer driver ("ABC PDL1") used in the printer. A line 906 indicates that the description of the printer ends.

In step S505 illustrated in FIG. 5, the OS 802 generates the description illustrated in FIG. 9, and adds the description to a predetermined file in the external storage device 215 as registration information relating to the printer. The predetermined file becomes a "printers.conf" file stored in a directory "/etc/cups/" in the CUPS, for example. By the addition, a printer queue to be registered is registered in the printing system in the OS 802. This becomes the registered print queue information 809. If a plurality of print queues is registered, the description illustrated in FIG. 9 for printers respectively corresponding to the print queues is repeated.

In step S505, the OS 802 registers a printer specification description file 806 in the printing system. The registration work is performed as follows. In FIG. 8, the OS 802 acquires the printer specification description file 806 in the print queue to be registered from the UI control module 805 in the printer driver, and registers the acquired printer specification description file 806 in a predetermined part (the printer specification description file 810) of the printing system. The printer specification description file 806 itself will be described before a method for registration in the printer specification description file 810 is described.

FIG. 10 illustrates an example of the printer specification description file 806. The printer specification description file 806 is described along a printer specification description format. The printer specification description file 806 will be described below based on the format.

In FIG. 10, a line 1001 describes a comment. The comment has "*%" at its head. A line 1002 describes a vendor name. A line 1003 describes a printer name corresponding to the printer specification description file 806. A line 1004 describes a page description language corresponding to the printer specification description file 806. A line 1005 describes a version of a printer driver. The subsequent lines describe functional specifications for the printer.

As the functional specifications, one function is described from a line 1006 starting with "*OpenUI" to a line 1010 starting with "*CloseUI". The line 1006 starts with "*OpenUI", followed by a function name having "*" added to its head. The function name is followed by a colon ":", further followed by a type at the time of selection of the function. The type includes "PickOne" and "Boolean". "PickOne" indicates that this function selects one of options. "Boolean" indicates that this function is controlled by On/Off.

A line 1006 includes a function "*PageSize", and indicates that this function selects one of options. A line 1007 subsequent to the line 1006 describes a default value of this function. This line 1007 starts with "*Default", followed by the function name, which has been defined in the previous line 1006. The line 1007 indicates that the default of the function "PageSize" is "A4". One of the options of the function is described in each of lines from the subsequent line 1008 to a line 1010 starting with "*CloseUI". For example, the line "1008" indicates that the one option of the function "PageSize" is "A3". The line "1009" indicates that the one option of the function "PageSize" is "A4". The function "PageSize" selects a page size, and the page size includes a large number of options. Therefore, options in the middle are omitted. The last description of this function is in a line 1010. This line 1010 starts with "*CloseUI", followed by the function name described in the line 1006 starting with "*OpenUI". The one function is thus described.

A block of the subsequent lines 1011 to 1016 describes another function. While overlapped description is not repeated, this block includes a function "Duplex", and indicates that this function selects any one of options, and the options include "None", "Simplex", and "Duplex". Actually, "*Duplex" represents a function of designating two-sided printing. "None" conforms to a default setting of the printer because printing is not designated, and "Simplex" and "Duplex" respectively mean one-sided printing and two-sided printing.

A method for registering the printer specification description file 806 will be described below. The OS 802 acquires the printer specification description file 806 corresponding to a printer to be registered from the UI control module 805, and stores the printer specification description module 806 in a predetermined location of the printing system, as illustrated in FIG. 11.

FIG. 11 illustrates a storage location of the printer specification description file 806 and a name of the file. As illustrated in FIG. 11, a storage location of the printer specification description file 806 is below a directory "/etc/cups/ppd/" 1101 in the external storage device 215. The printer specification description file 806 to be stored in the storage location has a file name including a name of a printer to be registered, followed by an underscore, further followed by an address of the printer to be registered, as illustrated in each of lines 1102 to 1104. More specifically, a printer specification description file 806 in a print queue to be registered is a file with an extension "ppd" having an identifier for identifying the print queue to be registered as a file name (the line 901 illustrated in FIG. 9). The added printer specification description file 810 is "PrinterC_192.168.1.10_.ppd" illustrated in the line 1104.

The printer specification description file 806 in the print queue to be registered is thus stored in the predetermined location of the printing system, as illustrated in FIG. 11, so that the printer specification description file 806 in the print queue to be registered is registered in the printing system. This file serves as the printer specification description file 810. The registration of the print queue is completed through the foregoing steps.

Setting of a print queue and a preset will be described below. FIG. 12 illustrates a user I/F (print dialog) obtained when a print setting dialog in a registered print queue is opened. The user I/F (print dialog) is a dialog displayed when a menu "print" existing in a file menu of an application, for example, is selected.

In FIG. 12, a print dialog 1201 includes controls 1202 to 1205 common to a printing system. The control 1202 enables selection of a print queue, the control 1203 enables selection of a preset, described below, the control 1204 enables selection of the number of copies serving as a basic function, and the control 1205 enables designation of a paper size.

A function inherent in a printer can be set in another portion. If the printer has a large number of functions, there is a method for switching a function group by a control 1206 without displaying all the functions at one time.

In the control 1206, a function related to "finishing" is displayed. The function related to finishing includes one-sided/two-sided designation 1207, stapling designation 1208, and bookbinding printing designation 1209. There are several other functions. Another function group can be switched by being designated in the control 1206.

In this dialog, when the user desires to switch a printer at an output destination, the print key selection control 1202 changes the printer. A print queue "PrinterA" is currently selected in the print dialog 1201. When the print queue selection control 1202 is clicked, to select a print queue "PrinterB", for example, prints are output to the print queue "PrinterB".

A preset setting will be described below. "Preset" is a print setting frequently used by a user, and is given a particular name and stored. For example, a default of a print queue is set to one-sided and 1-up printing. When the user frequently uses two-sided and 2-up printing, the default setting is given a name and stored as a preset in a manner described below. After the print dialog 1201 is opened and a default of a print queue is set to two-sided and 2-up printing, "store in another name" is selected in the preset selection control 1203, and a name of a preset to be stored is input so that the setting can be given a name and stored as a preset. The preset is stored in the preset description file 811 illustrated in FIG. 8. When the user desires to use this setting, the setting can be reproduced by only selecting the preset stored in the preset selection control 1203. The setting and storage of the preset will be described below.

FIG. 13 illustrates an example of the preset description file 811 (FIG. 8) storing a setting content of a preset. As illustrated in FIG. 13, a setting content of a plurality of presets is described in a tag <CustomPresetList>, as described in lines 1301 and 1310. One of the presets is described in a tag <presetSettings>, as described in lines 1302 and 1303. As a parameter of the tag <PresetSettingts>, a name of the preset is described.

The preset described in the lines 1302 and 1303 is named "Standard", and a setting content of the preset is "NULL". The preset description file 811 illustrated in FIG. 13 describes another preset, i.e., a preset named "Preset1" described in the lines 1304 to 1309. A setting content of the preset is described in the lines 1305 to 1308. The lines 1305, 1306, 1307, 1308 respectively indicate that ColorMode is "Color", Duplex is "Simplex", Resolution is "600", and LastQueue is "NULL".

An identifier "ABC." precedes each of the setting items to distinguish the setting items for each of vendors because the preset is managed by the OS 802 and is common to the vendors when used. As described above, the preset description file 811 shows the types of presets and a setting content of each of the presets.

Figure 14:
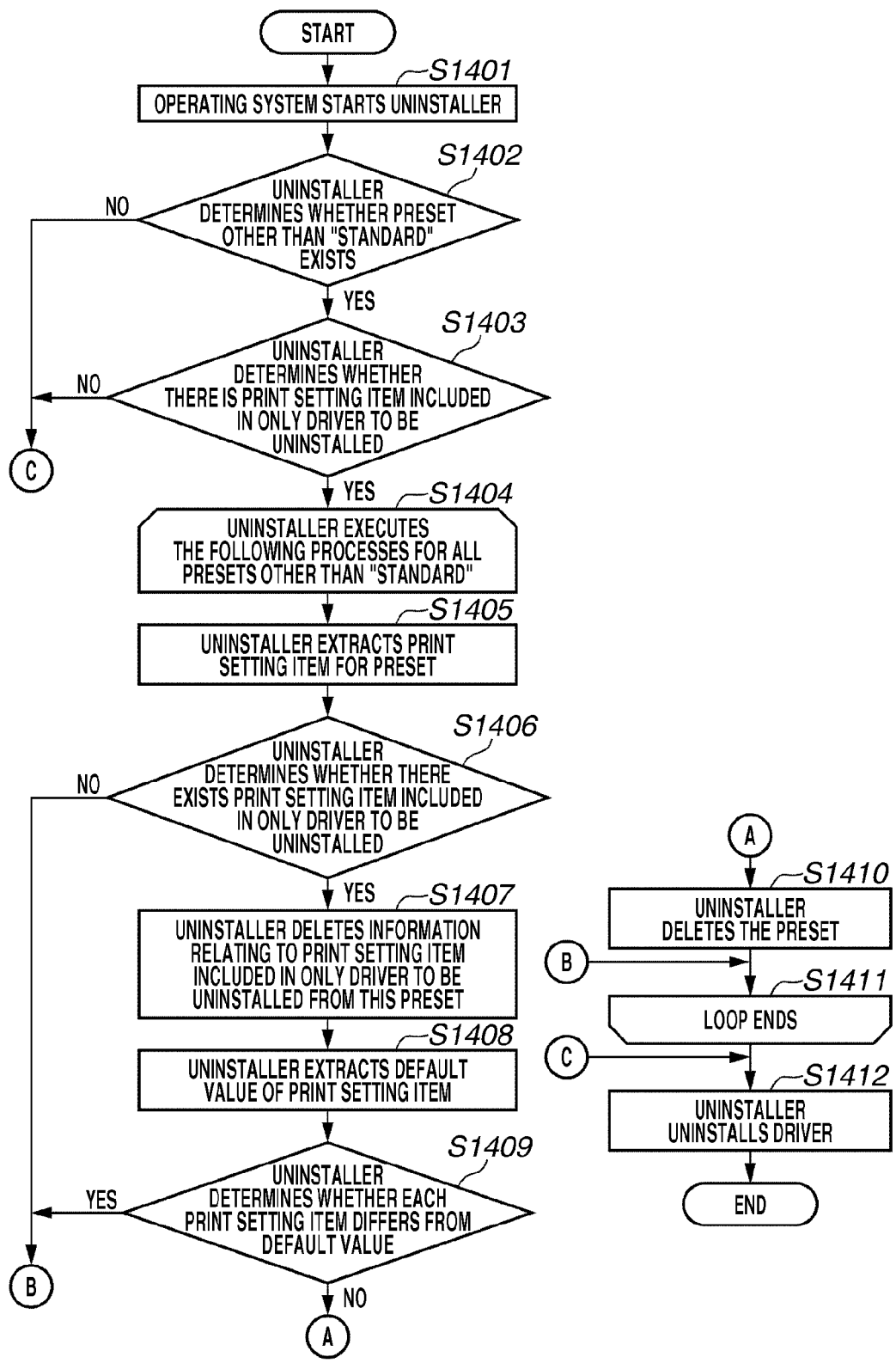
FIG. 14 is a flowchart illustrating an example of a procedure for uninstallation in a first exemplary embodiment of the present invention.

The flow in uninstalling a printer driver will be then described. FIG. 14 is a flowchart illustrating an example of a procedure for uninstallation in a first exemplary embodiment of the present invention. The CPU 203 executes a printer driver uninstaller (hereinafter referred to as an uninstaller) on the OS to implement processes in the flowchart. The uninstaller is stored in the external storage device 215 when the printer driver is uninstalled.

A user performs an operation to start the uninstaller, which is stored in the external storage device 215. The CPU 203 detects this operation to load an uninstaller program into the RAM 204 from the external storage device 215, and executes the program on the OS. More specifically, in step S1401, the OS 802 starts the uninstaller. An operation performed by the CPU 203 executing the uninstaller on the OS will be described as performed by the uninstaller with the uninstaller as a subject.

In step S1402, the uninstaller refers to the preset description file 811 illustrated in FIG. 13, to determine whether there exists a preset other than "Standard". "Standard" means not a particular preset but that no preset is designated.

If it is determined that there exists no preset other than "Standard" (NO in step S1402), the processing proceeds to step S1412. In step S1412, the uninstaller directly uninstalls the printer driver, and then the processing ends. On the other hand, if it is determined that there exists a preset other than "Standard" (YES in step S1402), the processing proceeds to step S1403.

In step S1403, the uninstaller refers to the printer specification description file 806 illustrated in FIG. 10, to determine whether all print setting items include a print setting item included in only a printer driver to be currently uninstalled. As a result, if it is determined that there is no print setting item included in only the printer driver to be uninstalled (NO in step S1403), the processing proceeds to step S1412. In step S1412, the uninstaller directly uninstalls the printer driver, and then the processing ends.

On the other hand, if it is determined that there is a print setting item included in only the printer driver to be uninstalled (YES in step S1403), the processing proceeds to step S1404. In step 1404, the uninstaller performs control to perform the following processes (corresponding to steps S1405 to S1410) for all presets other than "Standard".

In step S1405, the uninstaller first extracts print setting items for target presets. In step S1406, the uninstaller determines whether the print setting items extracted in step S1405 include a print setting item included in only the printer driver to be uninstalled (first determination processing). If it is determined that there exists no print setting item included in only the printer driver to be uninstalled (NO in step S1406), the processing proceeds to step S1411. In step S1411, the uninstaller ends processing for the preset, and shifts the processing to processing for the subsequent preset.

On the other hand, if it is determined that there exists a print setting item included in only the printer driver to be uninstalled (YES in step S1406), the processing proceeds to step S1407. In step S1407, the uninstaller deletes information relating to the print setting item included in only the printer driver to be uninstalled in the preset description file 811 illustrated in FIG. 13 from the preset (first deletion processing).

In step S1408, the uninstaller further refers to the printer specification description file 806 illustrated in FIG. 10 so as to extract a default value of print setting items for all print queues other than a print queue corresponding to the printer driver to be uninstalled. More specifically, a value represented by a line starting with "*Default" from the printer specification description file 806 illustrated in FIG. 10.

In step S1409, the uninstaller compares a value of each of the print setting items for the presets with the default value extracted in step S1408 to determine whether there is a difference therebetween. As a result, if there is a difference between the value of the print setting item for the preset and the default value (YES in step S1409), the processing proceeds to step S1411. In step S1411, the uninstaller ends processing for the preset, and shifts the processing to processing for the subsequent preset.

On the other hand, if there is no difference between the value of the print setting item for the preset during the processing and the default value extracted in step S1408 (NO in step S1409), the processing proceeds to step S1410. In step S1410, the uninstaller deletes information relating to the preset from the preset description file 811 illustrated in FIG. 13 (second deletion processing).

After a series of processes in steps S1405 to S1410 is performed for all the presets other than "Standard", the processing proceeds to step S1412. In step S1412, the uninstaller uninstalls the printer driver, and then the processing ends. By the uninstallation processing, the uninstaller deletes a printer driver module stored in a predetermined location of the external storage device 215 in step S402 illustrated in FIG. 4 at the time of installation.

A procedure for updating will be described using a specific example of a printer driver and a preset. In the case, preconditions relating to the printer driver and the preset are respectively illustrated in FIGS. 15A and 15B.

FIGS. 15A to 15C are diagrams for explaining an example of updating preset settings at the time of uninstallation. In the example as illustrated in FIGS. 15A to 15C, "Driver A", "Driver B", "Driver C", "Driver D" are installed as printer drivers, as illustrated in FIG. 15A. As print setting items settable by each of the printer drivers, "Driver A" enables setting of print setting items "ColorMode" and "Copiers", "Driver B" enables setting of print setting items "ColorMode", "Duplex", and "Copiers", "Driver C" enables setting of print setting items "ColorMode", "Staple", and "Copies", and "Driver D" enables setting of print setting items "Punch" and "Copies", for example, as illustrated in FIG. 15A. The print setting items described in FIG. 15A are an example of parts of functions of the printer, and the updating of the preset setting is not limited to the functions.

On the other hand, as setting for presets, "Preset P", "Preset Q", "Preset R", and "Preset S" are registered, as illustrated in FIG. 15B. "Preset P" has information relating to print setting items "Punch" and "Copies", "Preset Q" has information relating to print setting items "ColorMode", "Duplex", and "Copies", "Preset R" has information relating to print setting items "ColorMode", "Punch", and "Copies", and "Preset S" has information relating to print setting items "ColorMode", "Duplex", "Punch", and "Copies", for example, as illustrated in FIG. 15B.

On this premise, consider a case where a user uses the uninstaller to uninstall the printer driver "Driver D". A procedure for updating a preset setting at this time will be described with reference to FIG. 14.

In step S1401, when the user performs an operation to start an uninstaller for uninstalling the printer driver "Driver D", which is stored in the external storage device 215, the OS detects this operation to start the uninstaller for uninstalling the printer driver "Driver D". The uninstaller for uninstalling the printer driver "Driver D" is referred to as an "uninstaller".

In step S1402, the uninstaller then determines whether there exists a preset other than "Standard". At this time "Preset P", "Preset Q", "Preset R", and "Preset S" are registered as presets. Accordingly, in step S1403, the uninstaller then determines whether there is a print setting item included in only the printer driver "Driver D" to be uninstalled.

Since it is determined that there is "Punch" as the print setting item included in only the printer driver "Driver D" (YES in step S1403), as illustrated in FIG. 15A, the processing proceeds to step S1404. In step S1404, the uninstaller performs control to perform processes, described below, for all the presets "Preset P", "Preset Q", "Preset R", and "Preset S" other than "Standard".

In step S1405, the uninstaller first extracts print setting items for the preset "Preset P". In step S1406, the uninstaller determines whether the print setting items for the preset "Preset P" include the print setting item "Punch". Since the preset "Preset P" has information relating to the print setting item "Punch" (YES in step S1406), as illustrated in FIG. 15B, the processing proceeds to step S1407. In step S1407, the uninstaller deletes the print setting item "Punch" from the preset "Preset P".

In step S1408, the uninstaller then refers to the printer specification description file 806 including print queues corresponding to the printer drivers "Driver A", "Driver B", and "Driver C" other than "Driver D" to extract a default value of print setting items included in each of the printer drivers.

In step S1409, the uninstaller compares a value of each of the print setting items for the preset "Preset P" with the extracted default value, and determines whether there is a difference therebetween. At this time point, the preset "Preset P" has only the print setting item "Copies". Therefore, the uninstaller compares the value of the print setting item "Copies" with the extracted default value. If there is no difference between the extracted default value and the value for the preset "Preset P" (NO in step S1409), the processing proceeds to step S1410. In step S1410, the uninstaller deletes all the information relating to the preset "Preset P" from the preset description file 811. On the other hand, if there is a difference between the extracted default value and the value for the preset "Preset P" (YES in step S1409), the preset "Preset P" remains in the preset description file 811 while having information relating to the print setting item "Copies".

Similarly, processes are also performed for the print setting items "Preset Q", "Preset R", and "Preset S". Each of the presets "Preset R" and "Preset S" includes a print setting item "Punch". Therefore, in step S1407, the uninstaller deletes the print setting item "Punch" from the preset description file 811. In steps S1408 and S1409, the uninstaller compares values of each of the print setting items remaining as a result of the deletion for the presets "Preset R" and "Preset S" with the extracted default value. In step S1409, the uninstaller determines whether there are differences therebetween. If there are no differences therebetween (NO in step S1409), the processing proceeds to step S1410. In step S1410, the uninstaller deletes all information relating to the remaining print setting items from the preset description file 811. On the other hand, if there are differences between the extracted default value and the values for the presets "Preset R" and "Preset S", the presets "Preset R" and "Preset S" remain in the preset description file 811.

If is assumed that there are no differences between the values of the print setting item for the presets "Preset P" and "Preset R" and the default value, and there are differences between the values of the preset setting item for the presets "Preset Q" and "Preset S" and the default value. In this case, the preset description file 811 after the series of processes enters a state as illustrated in FIG. 15C.

A second exemplary embodiment of the present invention will be described below with reference to FIGS. 16, 17A, and 17B. FIG. 16 is a flowchart illustrating a part of a procedure for uninstallation in the second exemplary embodiment of the present invention. The flowchart corresponds to a portion from steps S1404 to S1411 illustrated in FIG. 14 in the flowchart according to the first exemplary embodiment, and steps before and after the steps S1404 to S1411 are omitted because they are the same as those in the first exemplary embodiment.

Figure 17A:
FIGS. 17A and 17B illustrate an example of a preset setting change notification dialog in the second exemplary embodiment of the present invention.
Figure 17B:

FIGS. 17A and 17B illustrate an example of a preset setting change notification dialog in the second exemplary embodiment of the present invention. In the present exemplary embodiment, confirmation is requested from a user when information relating to a print setting item is deleted from a preset description file 811 and when information relating to a preset is deleted. If an uninstaller determines that there is a print setting item included in only a printer driver to be uninstalled (YES in step S1403 illustrated in FIG. 14), the processing proceeds to processes illustrated in FIG. 16. In step S1601, the uninstaller first performs control to perform the following processes (corresponding to S1602 to S1611) for all presets other than "Standard".

In step S1602, the uninstaller first extracts print setting items for target presets. In step S1603, the uninstaller determines whether the print setting items extracted in step S1602 include a print setting item included in only the printer driver to be uninstalled. If it is determined that there is no print setting item included in only the print setting item (NO in step S1603), the processing proceeds to step S1612. In step S1612, the uninstaller ends processing for the preset, and shifts the processing to processing for the subsequent preset.

On the other hand, if it is determined that there is a print setting item included in only the printer driver to be uninstalled (YES in step S1603), the processing proceeds to step S1604. In step S1604, the uninstaller displays the preset setting change notification dialog illustrated in FIG. 17A, notifies the user of deletion of information relating to a particular print setting item, and requests permission from the user (first confirmation processing).

In step S1605, when the user inputs indication (judgment) whether information relating to a print setting item should be deleted from the preset setting change notification dialog illustrated in FIG. 17A, the uninstaller determines the indication (judgment) input by the user whether information relating to the print setting item should be deleted.

If it is determined that the information should not be deleted (inhibited from being deleted) (NO in step S1605), the processing proceeds to step S1612. In step S1612, the uninstaller ends processing for the preset, and shifts the processing to processing for the subsequent preset. On the other hand, if it is determined that the information should be deleted (allowed to be deleted) (YES in step S1605), the processing proceeds to step S1606. In step S1606, the uninstaller deletes information relating to the print setting item included in only the printer driver to be uninstalled in the preset description file 811 illustrated in FIG. 13 from the preset.

In step S1607, the uninstaller further refers to the printer specification description file 806 illustrated in FIG. 10 so as to extract a default value of print setting items for all print queues other than a print queue corresponding to the printer driver to be uninstalled.

In step S1608, the uninstaller compares a value of each of the print setting items for the preset with the default value extracted in step S1607 to determine whether there is a difference therebetween. As a result, if there is a difference therebetween (YES in step S1608), the processing proceeds to step S1612. In step S1612, the uninstaller ends processing for the preset, and shifts the processing to processing for the subsequent preset.

On the other hand, if there is no difference between the value of the print setting item for the preset during the processing and the default value extracted in step S1607 (NO in step S1608), the processing proceeds to step S1609. In step S1609, the uninstaller displays a preset setting change notification dialog illustrated in FIG. 17B, notifies the user of deletion of information relating to a particular preset, and requests permission from the user (second confirmation processing).

In step S1610, when the user inputs indication (judgment) whether information relating to a preset should be deleted from the preset setting change notification dialog illustrated in FIG. 17B, the uninstaller determines the indication (judgment) by the user whether the information relating to the preset should be deleted.

If it is determined that the information should not be deleted (inhibited from being deleted) (NO in step S1610), the processing proceeds to step S1612. In step S1612, the uninstaller ends processing for the preset, and shifts the processing to processing for the subsequent preset. On the other hand, if it is determined that the information should be deleted (allowed to be deleted) (YES in step S1610), the processing proceeds to step S1611. In step S1611, the uninstaller deletes the information relating to the preset from the preset description file 811 illustrated in FIG. 13. After a series of processes in steps S1602 to S1611 is performed for all the presets other than "Standard", the processing proceeds to step S1412 illustrated in FIG. 14.

Figure 18:
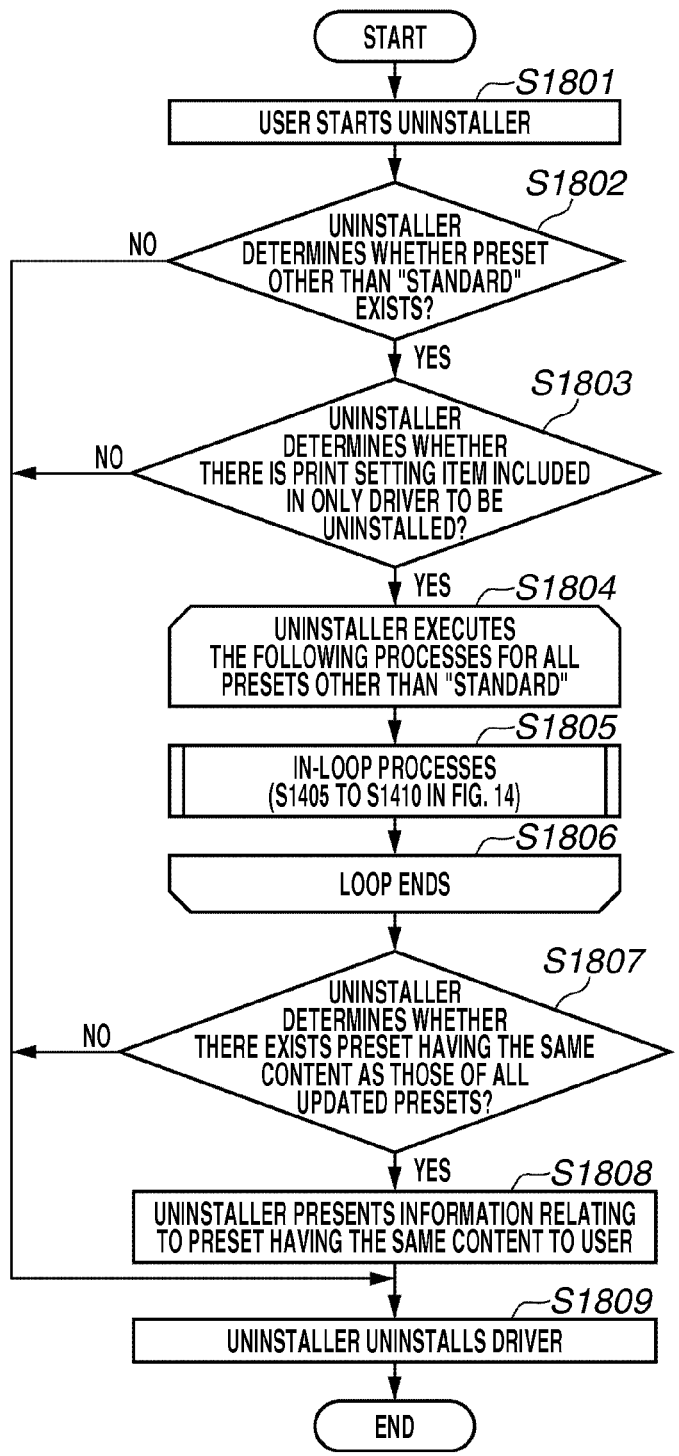
FIG. 18 is a flowchart illustrating an example of a procedure for uninstallation in a third exemplary embodiment of the present invention.

A third exemplary embodiment of the present invention will be described below with reference to FIGS. 18, 19A, and 19B. FIG. 18 is a flowchart illustrating an example of a procedure for uninstallation in the third exemplary embodiment of the present invention. "In-loop processing" in step S1805 illustrated in FIG. 18 corresponds to a portion from S1404 to S1411 illustrated in FIG. 14 in the flowchart according to the first exemplary embodiment.

Figure 19A:
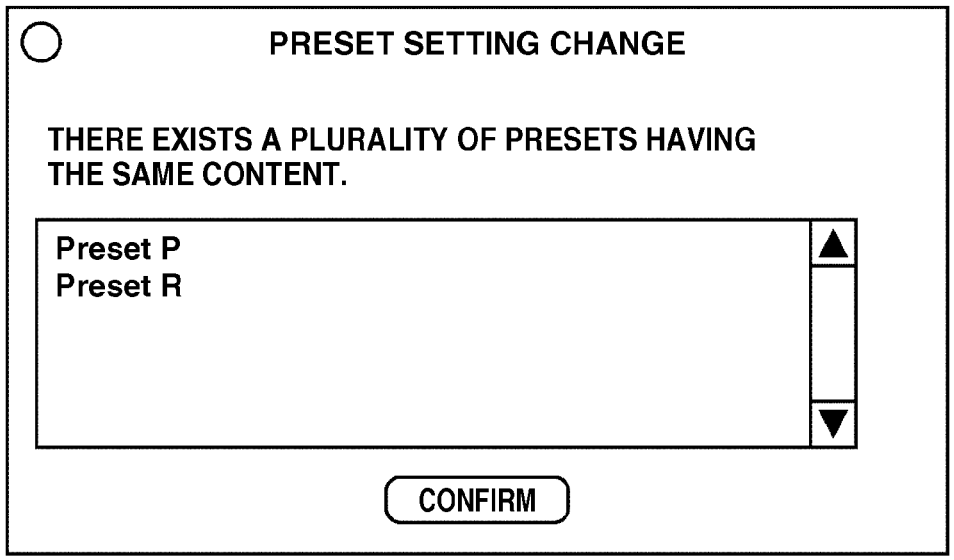
FIGS. 19A and 19B illustrate an example of a preset setting change notification dialog in the third exemplary embodiment of the present invention.
Figure 19B:
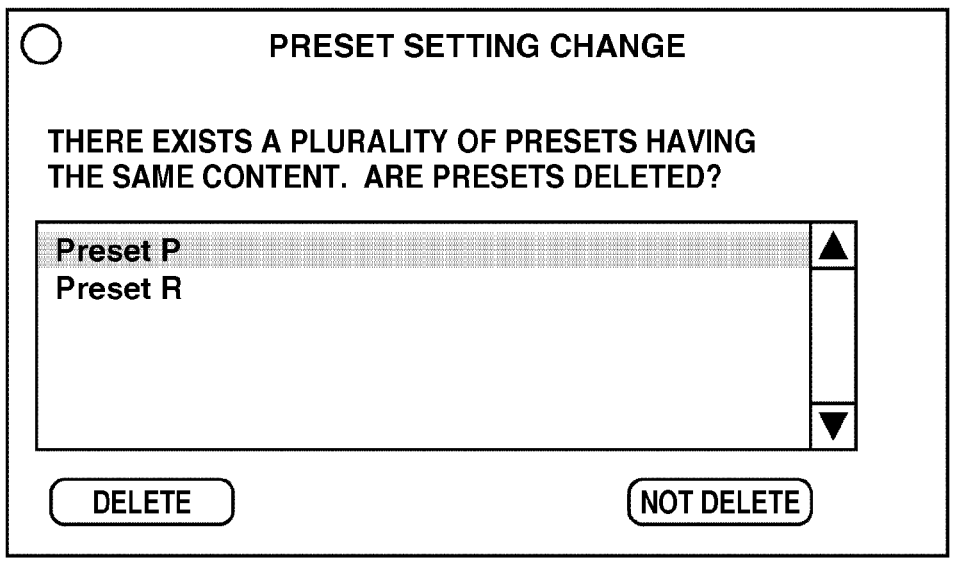

FIGS. 19A and 19B illustrate an example of a preset setting change notification dialog in the third exemplary embodiment of the present invention. In the preset exemplary embodiment, when there exists a preset having the same content as those of all updated presets, information relating to the preset having the same content is presented to a user. In step S1801, when the user performs an operation to start an uninstaller for uninstalling a printer driver, which is stored in an external storage device 215, an OS 802 detects this operation to start the uninstaller.

In step S1802, the uninstaller first refers to a preset description file 811 illustrated in FIG. 13 to determine whether there exists a preset other than "Standard". If it is determined that there exists no preset other than "Standard" (No in step S1802), the processing proceeds to step S1809. In step S1809, the uninstaller directly uninstalls the printer driver, and then the processing ends. On the other hand, if it is determined that there exists a preset other than "Standard" (YES in step S1802), the processing proceeds to step S1803. In step S1803, the uninstaller refers to a printer specification description file 806 illustrated in FIG. 10 to determine whether all print setting items include a print setting item included in only a printer driver to be uninstalled. If it is determined that there is no print setting item included in only a printer driver to be uninstalled (NO in step S1803), the processing proceeds to step S1809. In step S1809, the uninstaller directly uninstalls the printer driver, and then the processing ends.

On the other hand, if it is determined that there is a print setting item included in only a printer driver to be uninstalled (YES in step S1803), the processing proceeds to step S1804. In step S1804, the uninstaller performs control to perform processes in a loop (step S1805; corresponding to steps S1405 to S1410 illustrated in FIG. 14) for all presets other than "Standard".

After the processes in the loop are performed for all the presets other than "Standard" in step S1805, the processing proceeds to step S1807. In step S1807, the uninstaller determines whether there exists a preset having the same content as those of all presets updated this time as a result of performing a series of processes to step S1806 (second determination processing). If it is determined that there exists a preset having the same content (YES in step S1807), the processing proceeds to step S1808. In step S1808, the uninstaller displays a preset setting change notification dialog illustrated in FIG. 19A to notify the user of information relating to the preset having the same content. In step S1809, the uninstaller then uninstalls the printer driver, and then the processing ends.

On the other hand, if it is determined that there exists no preset having the same content as those of all the presets currently updated as a result of performing the series of processes to step S1806 (NO in step S1807), the processing proceeds to step S1809. In step S1809, the uninstaller directly uninstalls the printer driver, and then the processing ends.

In step S1808, described above, the uninstaller may display an operation panel as illustrated in FIG. 19B when it notifies the user of information relating to the preset having the same content so as to notify the user of deletion of the information relating to the preset having the same content and to request permission from the user (third confirmation processing). If the preset having the same content is allowed to be deleted, the preset to be deleted is also selected.

In this case, when the user inputs indication (judgment) whether the information relating to the preset having the same content should be deleted from a preset setting change notification dialog illustrated in FIG. 19B, the uninstaller determines the indication (judgment) by the user whether the information relating to the preset should be deleted. If it is determined that the information is not deleted (inhibited from being deleted), the processing proceeds to step S1809. In step S1809, the uninstaller directly uninstalls the printer driver, and then the processing ends.

On the other hand, if it is determined that the information is deleted (allowed to be deleted), the processing proceeds to step S1410. In step S1410, the uninstaller deletes the information relating to the preset, which is selected to be deleted in the preset setting change notification dialog illustrated in FIG. 19B from a preset description file 811 illustrated in FIG. 13 (third deletion processing). In step S1809, the uninstaller uninstalls the printer driver, and then the processing ends.

In the above-mentioned description, the "in-loop processes" in step S1805 illustrated in FIG. 18 correspond to a portion from steps S1404 to S1411 illustrated in FIG. 14 in the flowchart according to the first present exemplary embodiment. However, the "in-loop processes" in step S1805 illustrated in FIG. 18 may correspond to a portion from steps S1602 to S1611 illustrated in FIG. 16 in the flowchart according to the second exemplary embodiment.

While the three exemplary embodiments have been described above, the present invention is not limited to the above-mentioned exemplary embodiments. The present invention can take on various other embodiments. As described above, according to the exemplary embodiments of the present invention, in a system in which an OS holds a print setting and a cross-sectional preset for printer drivers, after the printer driver is uninstalled, a preset storing a setting relating to the uninstalled printer driver can be prevented from remaining as a preset, which makes no sense practical for a user, in a system.

The configurations and the contents of various types of data are not limited to these. The present invention has various configurations and contents depending on the intended use. While one exemplary embodiment has been described, the present invention can take on an exemplary embodiment as a system, an apparatus, a method, a program, or a storage medium, for example. More specifically, the present invention may be applied to a system including a plurality of devices or an apparatus including one device.

The present invention is also implemented by performing the following processing, that is, processing for supplying software (a program) for implementing the function in the above-mentioned exemplary embodiment to a system or an apparatus via a network or various types of storage media and reading out and executing the program using a computer (or a CPU, a microprocessing unit (MPU), etc.) in the system or the apparatus.

The present invention may be applied to a system including a plurality of devices, or may be applied to an apparatus including one device. The present invention is not limited to the above-mentioned exemplary embodiments. Various modifications (including an organic combination of the exemplary embodiments) can be made based on the spirit of the present invention, and are not excluded from the scope of the present invention. More specifically, the present invention includes all configurations that are combinations of the above-mentioned exemplary embodiments and their modified examples.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-054454 filed Mar. 11, 2010, which is hereby incorporated by reference herein in its entirety.

What is claimed is:

1. An information processing apparatus capable of performing printing by registering a print setting in a print queue registered by a printer driver as a preset in an operating system in a cross-sectional manner for a plurality of printer drivers and calling the registered preset as a print setting in a print queue registered by one of the printer drivers, the information processing apparatus comprising at least a processor and a memory storing instructions that, when executed by the processor, cause the information processing apparatus to function as:

a first deletion unit configured to identify a preset having a print setting related to a function inherent in a printer settable via a printer driver of the plurality of printer drivers when the printer driver is to be uninstalled, and to delete the print setting related to the function inherent in the printer from the identified preset when it is determined that the print setting is only included in the printer driver to be uninstalled;

a comparison unit configured to compare the preset from which the print setting related to the function inherent in the printer to be uninstalled has been deleted by the first deletion unit with a default value of the print setting in the print queue, and to compare the preset with print settings of registered print queues of other printer drivers of the plurality of printer drivers;

a second deletion unit configured to delete, when it is determined by the comparison unit that the preset does not include any print setting related to the registered print queues of other printer drivers of the plurality of printer drivers and there is no difference between the preset from which the print setting related to the function inherent in the printer to be uninstalled has been deleted by the first deletion unit and the default value of the print setting in the print queue, the preset from which the print setting related to the function inherent in the printer to be uninstalled has been deleted by the first deletion unit; and an uninstallation unit configured to uninstall the printer driver to be uninstalled.

2. The information processing apparatus according to claim 1, further comprising a confirmation unit configured to allow, when information relating to the print setting included in only the printer driver to be uninstalled is deleted from the preset, a user to confirm whether to delete the information.

3. The information processing apparatus according to claim 1, further comprising a confirmation unit configured to allow, when the preset is deleted, a user to confirm whether to delete the preset.

4. The information processing apparatus according to claim 1, further comprising:

a determination unit configured to determine whether a plurality of presets have the print setting deleted by the first deletion unit and a plurality of presets have the same print setting as a result of the deletion by the first deletion unit; and a third deletion unit configured to delete, when the determination unit determines that the plurality of presets have the same print setting as a result of the deletion by the first deletion unit, the plurality of presets having the same print setting with leaving one of the plurality of presets.

5. The information processing apparatus according to claim 4, further comprising a confirmation unit configured to allow, when the preset having the same content is deleted, a user to confirm whether to delete the preset.

6. A method for uninstalling a printer driver in an information processing apparatus capable of performing printing by registering a print setting in a print queue registered by a printer driver as a preset in an operating system in a cross-sectional manner for a plurality of printer drivers and calling the registered preset as a print setting in a print queue registered by one of the printer drivers, the method comprising:

via a first deletion unit, identifying a preset having a print setting related to a function inherent in a printer settable via a printer driver of the plurality of printer drivers when the printer driver is to be uninstalled, and deleting the print setting related to the function inherent in the printer from the identified preset when it is determined that the print setting is only included in the printer driver to be uninstalled;

via a comparison unit, comparing the preset from which the print setting related to the function inherent in the printer to be uninstalled has been deleted by the first deletion unit with a default value of the print setting in the print queue, and comparing the preset with print settings of registered print queues of other printer drivers of the plurality of printer drivers;

via a second deletion unit, deleting, when it is determined that the preset does not include any print setting related to the registered print queues of other printer drivers of the plurality of printer drivers and there is no difference between the preset from which the print setting related to the function inherent in the printer to be uninstalled has been deleted by the first deletion unit and the default value of the print setting in the print queue, the preset from which the print setting related to the function inherent in the printer to be uninstalled has been deleted by the first deletion unit; and via an uninstallation unit, uninstalling the printer driver to be uninstalled.

7. A non-transitory storage medium storing a program executed by an information processing apparatus capable of performing printing by registering a print setting in a print queue registered by a printer driver as a preset in an operating system in a cross-sectional manner for a plurality of printer drivers and calling the registered preset as a print setting in a print queue by one of the printer drivers, the program comprising:

identifying a preset having a print setting related to a function inherent in a printer settable via a printer driver of the plurality of printer drivers when the printer driver is to be uninstalled;

deleting the print setting related to the function inherent in the printer from the identified preset when it is determined that the print setting is only included in the printer driver to be uninstalled;

comparing the preset from which the print setting related to the function inherent in the printer to be uninstalled has been deleted with a default value of the print setting in the print queue, and comparing the preset with print settings of registered print queues of other printer drivers of the plurality of printer drivers;

deleting, when it is determined that the preset does not include any print setting related to the registered print queues of other printer drivers of the plurality of printer drivers and there is no difference between the preset from which the print setting related to the function inherent in the printer to be uninstalled has been deleted and the default value of the print setting in the print queue, the preset from which the print setting related to the function inherent in the printer to be uninstalled has been deleted; and uninstalling the printer driver to be uninstalled.

* * * * *